United States Patent [19]

Wehrenberg

[11] Patent Number: 5,197,049
[45] Date of Patent: Mar. 23, 1993

[54] HEAD AND MEDIA FOR OPTICAL DATA STORAGE

[75] Inventor: Paul J. Wehrenberg, Palo Alto, Calif.

[73] Assignee: Apple Computer, Inc., Cupertino, Calif.

[21] Appl. No.: 798,857

[22] Filed: Nov. 21, 1991

Related U.S. Application Data

[63] Continuation of Ser. No. 392,750, Aug. 11, 1989, abandoned.

[51] Int. Cl.$^5$ ............................................. G11B 11/00
[52] U.S. Cl. ................................... 369/13; 369/283; 369/284
[58] Field of Search .............. 369/283, 284, 286, 288, 369/275.1, 275.2, 13; 360/59

[56] References Cited

U.S. PATENT DOCUMENTS

| | | | |
|---|---|---|---|
| 4,586,092 | 4/1986 | Martens et al. | 369/13 |
| 4,587,533 | 5/1986 | Nakane et al. | 369/275.1 |
| 4,752,554 | 6/1988 | Sato et al. | 369/284 |
| 4,788,671 | 11/1988 | Kanda | 369/13 |
| 4,862,437 | 8/1989 | Okada | 369/13 |
| 4,873,679 | 10/1989 | Murai et al. | 369/284 |
| 4,890,178 | 12/1989 | Ichihara | 369/13 |
| 4,939,011 | 7/1990 | Takahashi et al. | 369/286 |
| 4,954,379 | 9/1990 | Nishida et al. | 369/288 |
| 4,959,820 | 9/1990 | Horimai et al. | 369/13 |

FOREIGN PATENT DOCUMENTS

| | | | |
|---|---|---|---|
| 0310392 | 4/1989 | European Pat. Off. | 369/283 |
| 0013534 | 2/1981 | Japan | 369/275.1 |
| 0212639 | 12/1982 | Japan | 369/275.1 |
| 0164037 | 9/1983 | Japan | 369/275.1 |
| 0127237 | 7/1984 | Japan | 369/284 |
| 0215037 | 12/1984 | Japan | 369/13 |
| 61-26954 | 2/1986 | Japan | 369/284 |
| 0268151 | 11/1988 | Japan | 369/283 |
| 0302444 | 12/1988 | Japan | 369/283 |
| 63-302444 | 12/1988 | Japan | 369/283 |

*Primary Examiner*—Eugene R. LaRoche
*Assistant Examiner*—Tan Nguyen
*Attorney, Agent, or Firm*—Mark Aaker

[57] ABSTRACT

A head and media for optical data storage with a media in which a partially light transmissive recording layer and a reflective layer are located on opposite faces of a transparent substrate layer. The head emits a light beam which passes through the recording layer, transits the substrate layer, reflects internally off the reflective layer, transits the substrate layer in the opposite direction, and comes to focus on the recording layer. This optical path is used for reading and writing. Two of these optical media, placed back to back, with recording layer faces outward, can be used to form a double-sided media with read and write capability from either side. In a magneto-optical system, since the recording layer is near the outer surface, both the optical and magnetic heads can be located and moved as a single unit, increasing the speed and reliability and reducing the cost.

4 Claims, 2 Drawing Sheets

HEAD AND MEDIA FOR OPTICAL DATA STORAGE

This is a continuation of co-pending application Ser. No. 07/392,750 filed on Aug. 11, 1989 abandoned.

BACKGROUND OF THE INVENTION

This invention relates to optical data storage. In particular, a focussed light beam is used to read or write data on a recording layer which is one of several layers of various materials which form a media. The invention includes the construction of the media, placement of the recording layer within the media, the optical path within the media, construction and placement of a head to read and write the media, and the construction of a double-sided media.

In a typical, known type of optical data storage system, either write-once or rewritable, a media is formed with a layer of recording material covered by a transparent substrate material. In a read-only media, the data would be placed in the recording layer during a manufacturing process, for example by a masking or embossing process. In a write-once or rewritable media, data is written into the recording layer during a writing process, which usually includes increased power and intensity of a laser light beam to alter the optical properties of the recording layer in a localized region. A lower intensity light beam can be used to read data from the recording layer.

The media can be formed as a disk which rotates about its center, and an optical head emitting a focussed light beam moves to various radial positions above the disk to access different portions of the disk. The light beam is focussed through an objective lens to enter through a top surface of the media nearest the optical head, travel down through the substrate material, and come to a point of focus on the recording layer located substantially at the bottom surface of the media. Dust or other contamination on the top surface will be out of focus and thus not interfere with the reading or writing process on the recording layer. Dust on the bottom surface does not matter because it is beyond the recording layer on which the optical beam focuses. For a given numerical aperture of the objective lens, the distance L from the entry surface to the recording layer must be greater than some minimum length to give an adequate dust defocusing effect. A double-sided media would place two such media back-to-back and have a thickness of at least 2 L or twice the thickness of a single media, making a double-sided media incompatible with mechanisms set for handling the thickness of a single media.

In a particular type of rewritable optical data storage known as magneto-optical storage, a strong magnetic field is required in the region of the focussed light beam when writing data. Several schemes require modulation of the magnetic field at frequencies comparable to the rate of writing the data, and thus the size and inductance of the magnetic head generating the magnetic field are kept small to achieve fast rates and to keep power consumption low. The requirement of small inductance forces use of a physically small magnetic head which must then co-move with the optical head as it accesses different regions of the media to bring sufficient magnetic field to the area being accessed. The magnetic head should also be positioned as close as possible to the recording layer within the media so that adequate field strength is achieved.

In typical, known magneto-optical systems, the optical head is placed above the top surface of the media and the light beam focuses down through the substrate to the recording layer, while the magnetic head is placed below the bottom surface of the media which brings it closer to the recording layer on the bottom surface. This requires movement and positioning mechanisms on both sides of the media which must move together across the disk. This greater complexity leads to increased size, cost and power consumption, slower access times, and less reliability. Because the media is simultaneously accessed from two sides, there is no way to increase storage capacity by using double-sided media. If the magnetic head is moved to the top surface and combined with the optical head, in order to simplify the positioning mechanisms, the magnetic head may be too far from the recording layer for adequate field strength.

The invention of this application allows an optical media to be half as thick for the same full dust defocusing distance L. This allows a double-sided media to be constructed in the same thickness as a standard single-sided media. Alternatively, in a standard thickness media, greater dust defocusing effect can be obtained. When used in a magneto-optical system, this invention allows the optical and magnetic head to be combined on the same side of the media, while bringing the magnetic head to be very close to the recording layer. The combined optical and magnetic head is less costly and more reliable than dual or separate heads. Since access to the media can be accomplished from one side, a double sided media can have two independent or simultaneously operating heads, one on each side, to reduce access times or increase transfer rates. These advantages are available to read-only, write-once, and rewritable optical systems in disk, tape, or card formats, in single or double-sided forms.

SUMMARY OF THE INVENTION

This invention provides an optical data storage media including a recording layer, a transparent substrate layer below the recording layer, and a reflective layer below the substrate layer. The recording layer is partially light transmissive and is located near the top surface of the media. The reflective layer is located substantially at the bottom surface of the media. A light beam entering at the top surface passes through the recording layer, transits the intervening substrate layer, reflects internally off the bottom surface, transits the substrate layer again in the opposite direction, and comes to focus on the recording layer. Because of this "folded" optical path, the media substrate can be half as thick while providing the same optical path length. This optical path can be used for reading or writing. In a magneto-optical system, the magnetic head can be moved to the top surface, to be close to the recording layer. The optical and magnetic heads can be combined and moved as a single unit, increasing the speed and reliability while reducing cost and power consumption. Two of these optical media can be placed back to back to form a double-sided media with read and write capability from either side.

DETAILED DESCRIPTION

Figure 1:
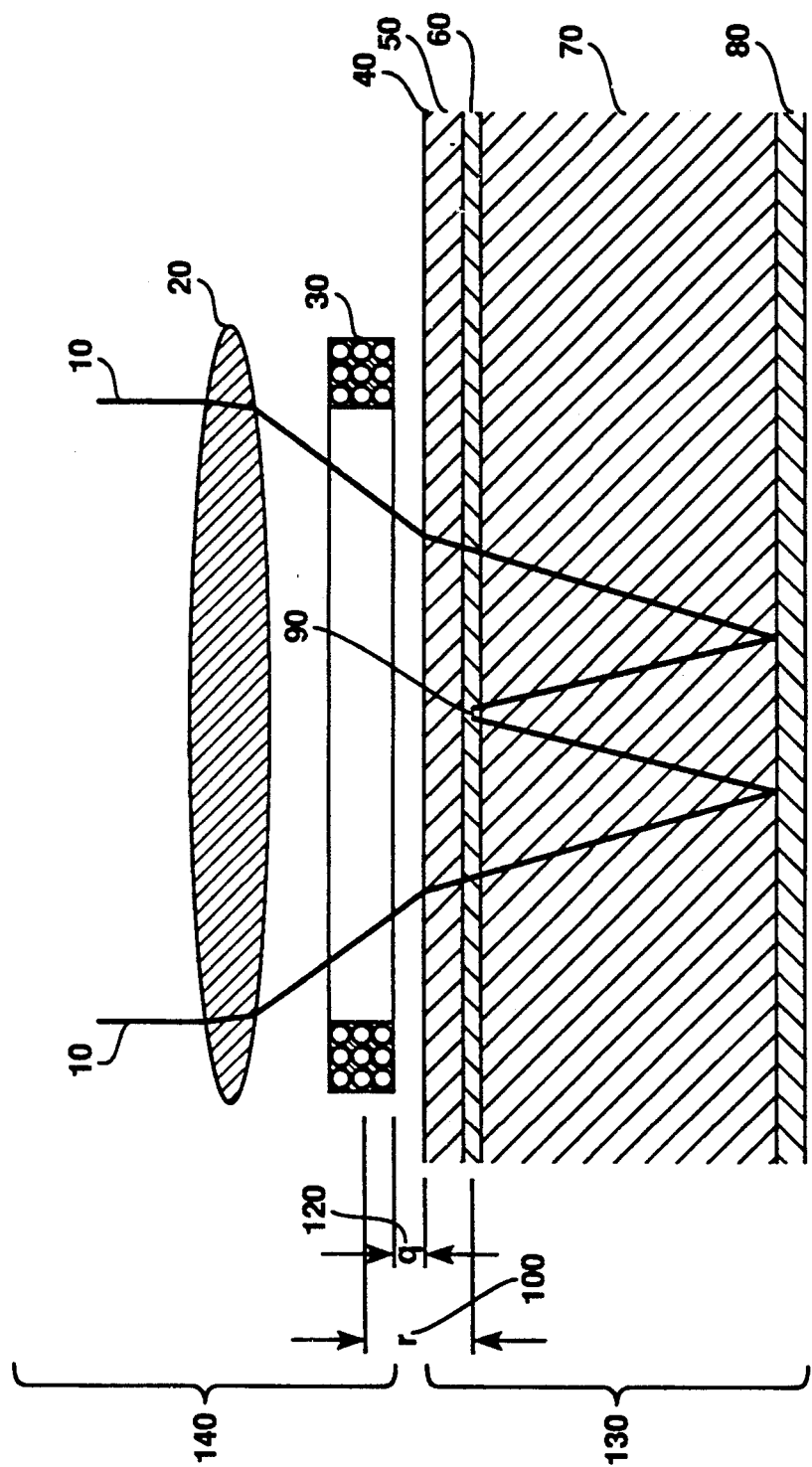
FIG. 1 shows a cross section of the optical media, optical head, and magnetic head of a magneto-optical data storage system in accordance with this invention.

FIG. 1 shows a cross section of the optical media, optical head, and magnetic head of a magneto-optical data storage system in accordance with this invention. The elements are shown in a simplified, schematic form, are not to scale, and supporting elements are omitted for clarity and ease of viewing the essential features. For convenience in describing the position of elements, terms relevant to the particular vertical orientation shown will be used; such as "top", "bottom", "above", and "below." These terms are not limiting to the practice of the invention in other orientations. While a magneto-optical system will be described, this invention is also applicable to optical data storage systems other than magneto-optical by removal of the magnetic head, and other alterations as known in the art.

A combined optical and magnetic head 140 travels a small distance q 120 above an optical media 130. Combined optical and magnetic head 140 has an objective lens 20 and a coil 30. A light beam 10 passes through the objective lens 20 as it propagates toward the optical media 130. The lens is designed and positioned so as to bring light beam 10 to a point of focus 90 on a recording layer 60 within the optical media 130. This objective lens 20 also gathers up returning light reflected from the point of focus 90 on the recording layer 60. The construction and operation of the objective lens 20 is known in the art. See, for example, *Principles of Optical Disc Systems*, G. Bouwhuis, et.al., Adam Hilger Ltd, Bristol and Boston, ISBN 0-85274-785-3.

In a magneto-optical system, a magnetic field in the region of the focal point 90 is provided by coil 30 of wire wound into an annular coil and driven by a modulatable electrical power source. Alternatively, coil 30 can be formed by deposition of a thick film conducting spiral on a transparent support. The coil 30 is constructed with a central clear area to allow the optical beam 10 to pass without obstruction. The coil 30 is mounted on the optical head so that the axis of the magnetic coil 30 and the optical axis of the objective lens 20 are substantially aligned as the optical-magnetic head moves over the surface of the optical media, and perpendicular to the plane of the media. The magnetic field at the focal point 90 is modulated as necessary for the magneto-optical write and erase process as is known in the art. See, for example, the previously cited *Principles of Optical Disc Systems*, G. Bouwhuis, et.al.

The optical media 130 is formed of numerous adhered layers as described below.

Below the substantially planar entry surface 40 of the optical media 130 is an overcoat layer 50. The overcoat layer 50 serves to protect the underlying layers from scratches and contamination. In this embodiment it is made of vacuum deposited silicon nitride, $Si_3N_4$, of thickness approximately 40 microns. Other materials and thickness and deposition processes are are also known in the art. See, for example, *Proceedings of SPIE*, Optical Data Storage Topical Meeting, eds. G. Knight and C. Kurtz, ISBN 0-8194-0113-7.

Below the overcoat layer 50 is the recording layer 60. Recording layer 60 holds the encoded analog or digital information. Recording layer 60 is partially light transmissive to allow a large percentage of the light beam 10 entering the media to pass through it. However, the recording layer 60 is also partially reflective. This provides a reflection from the recording layer 60 at the point of focus 90 of the light beam 10. This reflection returns to the optical head to be detected. The recording layer 60 can be pre-encoded with information or can be writable. The information may be in analog or digital form. The encoded information may be placed in the recording layer 60 during a manufacturing process, or added later by a writing process on the media.

For example, in a read-only disk the recording layer 60 may be a stipple pattern of pits of various lengths covered with partially reflective material formed during the media manufacturing process.

In a write-once or rewrite disk, the material of the recording layer 60 is also partially light absorbing. This allows writing of data to the disk by use of a high intensity light beam. At the point of focus 90 the intensity of the light beam coupled with the absorption of the recording layer 60 at that spot will be sufficient to melt or alter the recording material at that spot. In the illustrated magneto-optical system, the recording layer 60 is written by a high intensity light beam in the presence or absence of a magnetic field. The resultant material assumes different reflection polarization characteristics depending on whether it was written with the magnetic field up or down. For magneto-optical recording the recording layer 60 can be made of vacuum deposited terbium cobalt of thickness approximately 10 nanometers. Other suitable materials and thickness and deposition processes are also known in the art. Also known is construction of recording layers using multi-layer thin films. See, for example, the previously cited *Proceedings of SPIE*. During the reading process, a low intensity light beam 10 can be used to protect through the media 130, along the folded optical path to reach the point of focus 90. The reflection from this point of focus 90 returns along the folded optical path to the optical head where its presence, strength or polarization shift can be detected and decoded.

Below the recording layer 60 is the media substrate 70 which provides the structural rigidity of the media 130 and supports the vacuum deposited layers. The substrate 70 also provides the distance over which the light beam 10 twice passes as it converges to reach the point of focus 90. The substrate 70 is transparent or highly light transmissive to the wavelength of light being used as the light beam 10. The substrate 70 is preferably made of transparent polycarbonate and is approximately 0.6 millimeter thick. Other materials such as PMMA or glass with photopolymer layers are also known in the art. See, for example, the previously cited *Proceedings of SPIE*.

Below the media substrate 70 and serving as the back surface of the media 130 is a reflective layer 80, which can be made of vacuum deposited aluminum of approximately 100 nanometers thickness. Other reflective materials and reflective multi-layer structures are known in the art. See, for example, *The Handbook of Optics*, ed. G. Driscoll, McGraw Hill, ISBN 0-07-047710-8. Other protective or support layers could be added below reflective layer 80.

Variation of the materials and thicknesses of these layers, and the insertion and deletion of other layers is within the scope of this invention. Any of the described layers could be formed by a group or combination of several layers of materials. The key points in the structure of the media 130 are that the recording layers 60 is located near the top of media 130 and that there is a reflective layer or layers 80 spaced a distance from the recording layer 60, such as on the bottom of media 130. The distance between the recording layer 60 and the reflective layer 80 is relatively large compared to the thickness of the recording layer 60 and reflective layer 80.

In the process of reading from the optical storage media 130, A light beam 10 shines into the media 130. The outer diameter of light beam 10 is shown as the optical beam passes through the objective lens 20 and enters the optical media 130 through the entry plane 40 of the media 130. The converging light beam 10 then transits through the overcoat layer 50, the recording layers 60, and the transparent substrate 70. The converging beam 10 then reflects off of reflective layer 80 on the back side of the transparent substrate 70, retransits the transparent substrate 70, and comes to focal point 90 on the recording layer 60. Some of the light which illuminates the focal point 90 on recording layer 60 is reflected back into the transparent substrate 70 as a reflected beam or diverging beam. This diverging beam transits the transparent substrate 70, reflects off of the reflective layer 80, retransits the transparent substrate 70, passes through the recording layer 60 and the overcoat layer 50, and enters the head 140 to reach the objective lens 20. This diverging beam carries the signal information to be detected and decoded by means known in the art to detect signal strengths or polarization shifts. See, for example, the previously cited *Proceedings of SPIE*.

The absorption, reflection, and transmission characteristics of the recording layer 60 are adjusted to give good system performance. For a recording layer 60 for a magneto-optical system, typical values are absorption equals 30%, reflection equals 20%, and transmission equals 50%. Variation of these values is within the scope of the invention. Greater transmission provides a greater beam intensity to the point of focus 90, and correspondingly increases the strength of a returning diverging light beam. Greater reflection may increase the strength of a returning diverging light beam reflected from the point of focus 90 on the recording layer 60. Greater absorption may be desirable in a write-once or rewritable system to reduce the intensity needed to write a spot on the recording layer 60.

In a optical storage drive incorporating a head and media, the typical separation q 120 of the head 140 from the entry plane 40 of the media 130 is approximately 0.1 millimeter. Typical magnetic separation r 100 of the center of the coil 30 to the recording layer 60 is approximately 0.2 millimeter. The dust defocusing distance L, is equal to the distance traveled by the light beam from the entry plane 40 of the media 130 to the recording layer 60. Since the light beam 10 reaches the recording layer 60 via reflection off the back reflective layer 80, this distance is at least twice the thickness of the transparent substrate 70 or approximately 1.2 millimeter.

In the case of prior systems with the magnetic coil 30 and objective lens 20 on the same side of the media and the recording layer 60 on the backside of the substrate 70, the ratio of dust defocusing distance L to magnetic coil distance r is slightly less than 1:1. In this invention with the typical values described above, the ratio is approximately 6:1. Since the magnetic field strength tends to fall off as the inverse of the cube of the distance from the magnetic coil 30, this invention increases the magnetic field strength at the recording layer 60 by a factor of approximately 6 cubed or 216 when compared to prior system. Thus adequate field strength can be obtained with much less power consumption in driving the coil 30.

Figure 2:
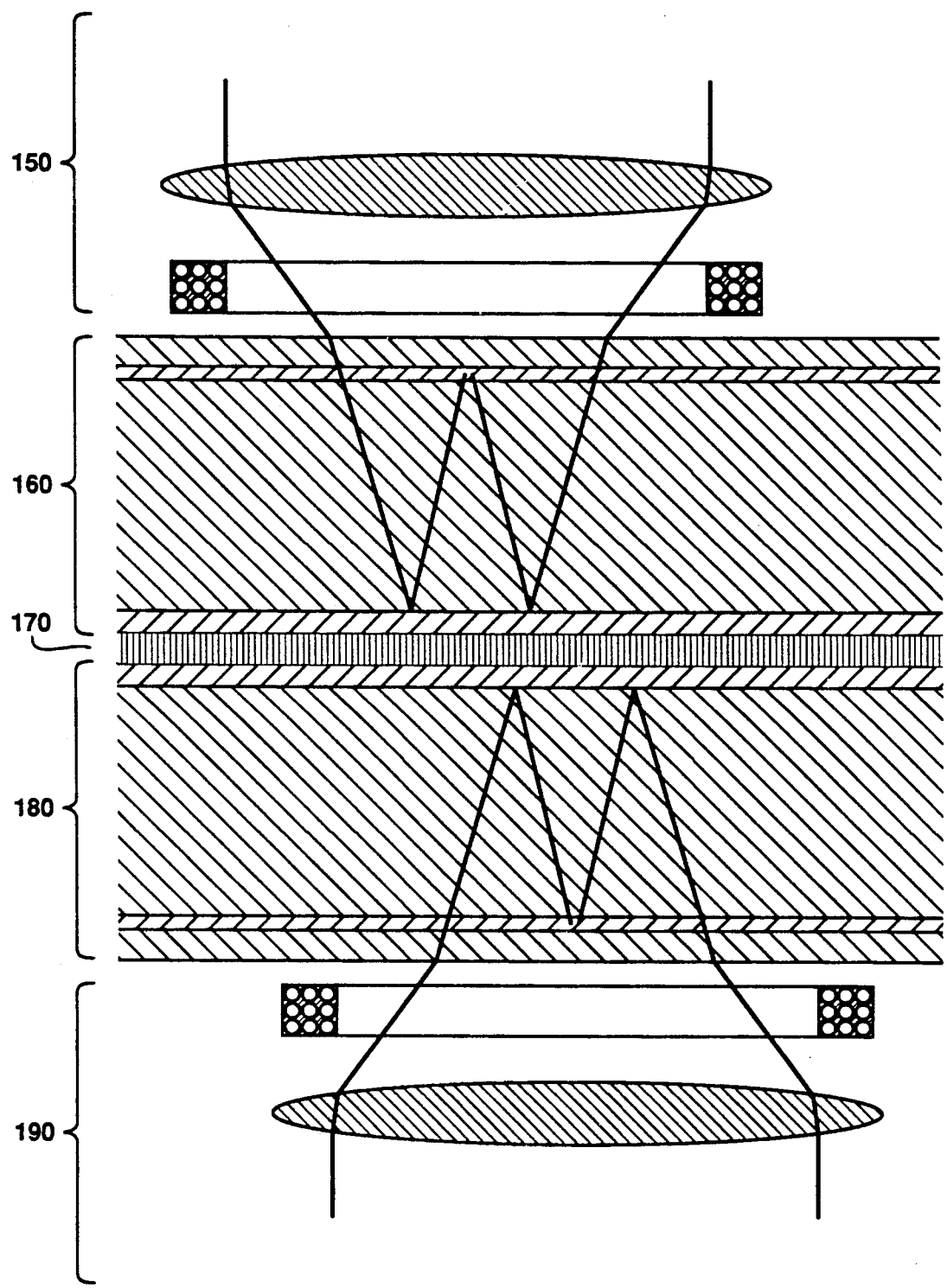
FIG. 2 shows a double-sided magneto-optical data storage system in accordance with this invention.

FIG. 2 shows a double-sided magneto-optical data storage system in accordance with this invention. A double-sided media is formed of a first single-sided optical media 160 and a second single-sided optical media 180. The double-sided media could be formed as a single unit, or as shown in FIG. 2, could be formed by placing two single sided media 160, 180 together back-to-back. The two media can be held together by an epoxy adhesive layer 170. The adhesive 170 bonds the two reflective layer sides in close proximity and a double-sided optical media is formed. Other adhesives or fastening methods could be used.

The double-sided media formed as a disk can be rotated on a single spindle. Within the scope of this invention, two single sided disks can be co-rotated on a single spindle without benefit of a uniform adhesive layer between them, but rather with a non-uniform adhesive layer or by clamping pressure at the hub region of the disks.

A first head 150 containing lens and coil elements reads and writes on first optical media 160, while a second head 190 can read and write on second optical media 180. Thus, a single drive containing two coupled or independently positioned optical heads and a double-sided disk as shown in FIG. 2 has on line storage capacity equal to twice that of a single sided optical disk.

These and other embodiments can be practiced without departing from the true scope and spirit of the invention, which is defined by the following claims.

What is claimed is:

1. A layered optical data storage media comprising:
    an overcoat layer for protecting underlying layers and for passing a relatively wide entering and converging light beam in a first direction into said media;
    a partially light transmissive recording layer below said overcoat layer for partially passing said relatively wide entering and converging light beam in said first direction;
    a substrate layer below said recording layer for receiving said relatively wide entering and converging light beam, and for converging said relatively wide entering and converging light beam to a substantially narrower entering and converging light beam while said beam is traveling in said first direction across the thickness of said substrate layer, and exiting from said substrate layer said substantially narrower entering and converging light beam; and
    a reflecting layer below said substrate layer for reflecting said substantially narrower entering and converging light beam back into said substrate layer as a substantially narrower reflected and converging light beam traveling in a second direction substantially opposite to said first direction;
    said substrate layer further adapted for receiving said substantially narrower reflected and converging light beam, for further converging said substantially narrower reflected and converging light beam to a point of focus while said beam is traveling in said second direction across the thickness of said substrate layer, and exiting said point of focus from said substrate layer back into said recording layer;

said recording layer further adapted for reading and writing of data on said recording layer where said point of focus falls on said recording layer;

whereby, said substrate layer forms a folded optical path for the convergence of a light beam to said point of focus.

2. A double-sided layered optical data storage media comprising:

a first overcoat layer for receiving a first relatively wide entering and converging light beam traveling in a first direction into said media;

a first partially light transmissive recording layer below said first overcoat layer for partially passing said first relatively wide entering and converging light beam in said first direction;

a first transparent substrate layer below said first recording layer for receiving said first relatively wide entering and converging light beam, and for converging said first relatively wide entering and converging light beam to a first substantially narrower entering and converging light beam while said beam is traveling in said first direction across the thickness of said first substrate layer, and exiting from said first substrate layer said first substantially narrower entering and converging light beam;

a first reflecting layer below said first substrate layer for reflecting said first substantially narrower entering and converging light beam back into said first substrate layer as a first substantially narrower reflected and converging light beam traveling in a second direction substantially opposite to said first direction;

said first substrate layer further adapted for receiving said first substantially narrower reflected and converging light beam, for further converging said first substantially narrower reflected and converging light beam to a first point of focus while said beam is traveling in said second direction across the thickness of said first substrate layer, and exiting said first point of focus from said substrate layer back into said recording layer;

said first recording layer further adapted for reading and writing of data on said first recording layer where said first point of focus falls on said first recording layer;

a second overcoat layer below said first reflecting layer for receiving a second relatively wide entering and converging light beam traveling in said second direction into said media;

a second partially light transmissive recording layer below said first reflecting layer and above said second overcoat layer for partially passing said second relatively wide entering and converging light beam in said second direction; and a second transparent substrate layer below said first reflecting layer and above said second recording layer, for receiving said second relatively wide entering and converging light beam, and for converging said second relatively wide entering and converging light beam to a second substantially narrower entering and converging light beam while said beam is traveling in said second direction across the thickness of said second substrate layer, and exiting from said second substrate layer said second substantially narrower entering and converging light beam;

said second reflecting layer to reflect said substantially narrower entering and converging light beam as a second substantially narrower reflected and converging light beam back into said second substrate layer in said first direction;

said second substrate layer further adapted for receiving said second substantially narrower reflected and converging light beam, for further converging said second substantially narrower reflected and converging light beam to a second point of focus while said beam is traveling in said first direction across the thickness of said second substrate layer, and exiting said second point of focus from said second substrate layer back into said second recording layer; and said recording layer further adapted for reading and writing of data on said recording layer where said second point of focus falls on said recording layer.

3. A method of using a layered optical data storage media comprising:

receiving a relatively wide entering and converging light beam through a partially light transmissive recording layer;

converging said relatively wide entering and converging beam to a substantially narrower entering and converging beam as the beam passes through a transparent substrate layer;

reflecting said substantially narrower entering and converging beam from a reflecting layer as a substantially narrower reflected and converging beam;

returning said substantially narrower reflected and converging beam through said substrate layer in the opposite direction of the path of said relatively wide entering and converging beam; and converging said substantially narrower reflected and converging beam to a point of focus on said recording layer for reading and writing of data on said recording layer at said point of focus.

4. A method of using a layered optical data storage media as in claim 3 further comprising reflecting from said point of focus on said recording layer back across said substrate a diverging beam; reflecting said diverging beam from said reflecting layer as a reflected and diverging beam; returning said reflected and diverging beam through said substrate layer in the opposite direction of the path of said diverging beam; and exiting said reflected and diverging beam through said partially light transmissive recording layer to exit said media in the opposite direction of the path of said relatively wide entering and converging light beam.

* * * * *